United States Patent
Devanbu et al.

(10) Patent No.: US 6,237,094 B1
(45) Date of Patent: *May 22, 2001

(54) SYSTEM AND METHOD FOR USING A SECOND RESOURCE TO STORE A DATA ELEMENT FROM A FIRST RESOURCE IN A FIRST-IN FIRST-OUT QUEUE

(75) Inventors: Premkumar Thomas Devanbu, Davis, CA (US); Stuart Gerald Stubblebine, Lebanon, NJ (US)

(73) Assignee: AT&T Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/604,954

(22) Filed: Jun. 28, 2000

Related U.S. Application Data (63) Continuation of application No. 09/022,046, filed on Feb. 11, 1998, now Pat. No. 6,098,170.
(60) Provisional application No. 60/047,247, filed on May 21, 1997.

(51) Int. Cl.[7] .................................................. H04L 9/00
(52) U.S. Cl. ............................ 713/176; 713/165; 713/187
(58) Field of Search ................................. 713/156, 165, 713/176, 178, 181, 187, 200; 707/10; 711/132

(56) References Cited

U.S. PATENT DOCUMENTS

| | | | |
|---|---|---|---|
| 5,001,752 | 3/1991 | Fischer | 380/23 |
| 5,235,642 | 8/1993 | Wobber et al. | 380/25 |
| 5,412,717 | 5/1995 | Fischer | 380/4 |
| 5,568,554 | 10/1996 | Eastlake et al. | 380/25 |
| 5,608,800 | 3/1997 | Hoffman et al. | 380/25 |
| 5,671,446 | 9/1997 | Rakity et al. | 395/874 |
| 5,757,919 | 5/1998 | Herbert et al. | 380/25 |
| 5,784,459 | 7/1998 | Devarakonda et al. | 380/4 |
| 6,098,170 | * 8/2000 | Devanbu et al. | 713/176 |

FOREIGN PATENT DOCUMENTS

| | | |
|---|---|---|
| 0814398 | 12/1997 | (EP) . |
| WO90/13084 | 11/1990 | (WO) . |
| WO95/15522 | 6/1995 | (WO) . |

OTHER PUBLICATIONS

Blum, et al., "Checking the Correctness of Memories", FOCS 91 Dec. 1992.
Devanbu, et al., "Stack and Queue Integrity on Hostile Platforms" Apr. 1998.
Haber, et al. "How to Time Stamp a Digital Document," J. Cryptology pp. 99–111 1991.
Scheier, Applied Cryptography, p. 130–133 1996.

* cited by examiner

*Primary Examiner*—Tod Swann
*Assistant Examiner*—Steve Kabakoff
(74) *Attorney, Agent, or Firm*—Kenyon & Kenyon (57) ABSTRACT

A system and method are provided for storing a data element from a first resource in a queue at a second resource. A combination of a data element $X_{N+1}$ and a signature $S_Q=S[N]$ are signed at a first resource to obtain a signature $S[X_{N+1},S[N]]$, where N is an integer. The data element data element $X_{N+1}$ and the signature $S[X_{N+1},S[N]]$ are sent from the first resource to the second resource to be stored in the queue at the second resource. The signature $S[X_{N+1},S[N]]$ is stored at the first resource as the new value for $S_Q$.

17 Claims, 7 Drawing Sheets

SYSTEM AND METHOD FOR USING A SECOND RESOURCE TO STORE A DATA ELEMENT FROM A FIRST RESOURCE IN A FIRST-IN FIRST-OUT QUEUE

CROSS-REFERENCES TO RELATED APPLICATIONS

This application is a Continuation of U.S. patent application Ser. No. 09/022,046 filed Feb. 11, 1998 (and issued as U.S. Pat. No. 6,098,170), which is a Continuation of Provisional Application No. 60/047,246 filed May 21, 1997.

This application claims the benefit of U.S. Provisional Application No. 60/047,247, filed May 21, 1997.

BACKGROUND OF THE INVENTION

Reliably storing a data element at a resource is an important capability of an information system. A data element is defined to be an item of information. Examples of a data element include an alphanumeric character, a string, an integer, and a floating point number, and any combination thereof. A resource is an apparatus capable of storing a data element.

A resource typically has a finite amount of memory for storing data elements. When the memory of a resource is full, additional data elements cannot be stored at the resource. In this case, the capabilities of the resource can be substantially compromised, and certain data elements that the resource is supposed to store can be lost permanently.

One known system addresses this problem by making available to the first resource a second resource that has memory to spare. For example, a first resource whose memory is full, or about to be full, stores a data element at a second resource. This sharing of memory advantageously distributes the burden of storing data elements across resources.

In one embodiment of this known system, a first resource is connected to a second resource through a network. When the memory space at the first resource becomes limited, the first resource sends a first data element to the second resource through the network, where the first data element is stored. When the first resource later needs the first data element, it sends a request through the network to the second resource. In response, the second resource sends the first data element back to the first resource through the network.

In another embodiment of this known system, a first resource is connected directly to a second resource through an interface. For example, the first resource is a smart card coupled to a second resource, a laptop computer, through a PCMCIA interface. When the memory in the smart card becomes limited, the smart card sends a first data element to the computer through the interface to be stored at the computer. When the smart card needs the first data element again, the smart card sends a request to the computer, and the computer returns the first data element to the smart card.

Although this known system mitigates the problems associated with the limited amount of available memory at a first resource, this known system disadvantageously provides no assurance to the first resource that the data element returned by a second resource is the same as the data element sent earlier from the first resource to the second resource to be stored. In other words, this system provides no assurance to the first resource that the data element retrieved from storage at the second resource has not been modified in some way.

Indeed, it is possible that the data element returned from the second to the first resource may be different from the data element that was sent from the first to the second resource to be stored. To reflect this possibility, the data element sent from the first resource to be stored on the second resource is called the "first data element." The data element received at the first resource ostensibly from the second resource and purported to be the first data element is called the "second data element."

The second data element may not be the same as its corresponding first data element for any of several reasons. For example, the second data element may have been the same as the first data element when it was sent from the second resource to the first resource, but been modified in transit to the first resource. For example, noise may have been injected into the second data element, corrupting it. Alternatively, the second data element may have been modified at a way point (e.g., a router, proxy, etc.) between the second and first resources. On the other hand, the second data element may have been modified (either accidentally or purposefully) at the second resource. Likewise, the request from the first resource for the first data element can be intercepted by a third party, which can inject its own version of the first data element by sending it to the first resource in response to the request. The first resource can then unknowingly accept a false version of the first data element as it was provided by the third party.

If the second data element is not the same as the first data element, and if the first resource is unable to detect this condition, then disaster can result. For example, suppose the first resource is responsible for computing new account balances for a bank. When the memory of the first resource becomes limited, the first resource stores certain account balances and the interim results of certain calculations at a second resource, also owned by the bank. The first resource receives a second data element that is not the same as its corresponding first data element. For example, the first resource stores a bank balance of $46,325.00 (the first data element) at the second resource, which the first resource later asks for from the second resource. The second resource returns the value $35.93 (the second data element). Thus, the account balance now stored at the first resource is erroneous, and all subsequent calculations based upon that incorrect account balance will also be erroneous.

There are certain known techniques for protecting the integrity of data that is stored in a possibly untrusted memory resource. See Nancy M. Amato and Michael C. Loui, *Checking Linked Data Structures*, Proceedings of the 24th Annual International Symposium on Fault-Tolerant Computing (FTCS), 1994; and Manual Blum, William Evans, Peter Gemmell, Sampath Kannan and Moni Noar, *Checking the Correctness of Memories*, Algorithmica, 12(2/3, pages 225–244, 1994 (also available in the proceedings of FOCS (Foundations of Computer Science) '91). These techniques address the problem of verifying the correctness of a large memory of size n bits maintained by an all-powerful adversary P (i.e., P has unlimited computer power), subject to update requests originator V that has a limited amount of trusted memory. It has been shown that P can fool V with an incorrect memory whenever V has access to less than log(n) bits of trusted memory. The reference, Manual Blum, William Evans, Peter Gemmell, Sampath Kannan and Moni Noar, *Checking the Correctness of Memories*, Algorithmica, 12(2/3, pages 225–244, 1994 and FOCS '91 Proceedings, also describes implementations of stacks and queues along these lines. The stack implementation uses log(H) memory accesses for operations on a stack of height H.

For practical purposes, it is both unduly expensive and unnecessary to provide for protection against an all-powerful adversary P. It would be more practical to develop a technique that is effective if adversary P is less than all-powerful, but is faster (has more computing power) than the V. It would be further advantageous if, unlike the techniques shown in the prior art, an unlimited amount of data could be stored in untrusted memory in a trusted fashion while using a constant number of bits of trusted memory. Further, the prior art performs a number of memory store and retrieve operations that increases with the amount of data stored on the untrusted resource. A better, more economical system would need to perform only some reasonably-sized fixed number of operations for any amount of data stored in a queue on the untrusted resource, no matter how large.

SUMMARY OF THE INVENTION

In accordance with an embodiment of the present invention, a system and method are provided for storing a data element from a first resource in a queue at a second resource. A data element $X_{N+1}$ and a signature $S_Q=S[N]$ are singed at a first resource to obtain a signature $S[X_{N+1},S[N]]$, where N is an integer. The data element $X_{N+1}$ and the signature $S[X_{N+1},S[N]]$ are sent from the first resource to the second resource to be stored in the queue at the second resource. The signature $S[X_{N+1},S[N]]$ is stored as the new value for $S_Q$.

In an embodiment of the present invention, the first resource retrieved a data element Y and a signature purportedly from the queue at the second resource. A combination of the data element Y and a signature $S_R$ are signed at the first resource to obtain a signature S', where $S_R$ is equal to the value of S[M], where M is the number of data elements that have been removed from the queue. The first resource determines if the data element Y is valid using signatures S' and $S_R$. In one embodiment of the present invention, the data element Y is valid if S'=$S_R$. In another embodiment, Y is valid if S'=$KS_R$, where K is an integer.

The present invention advantageously allows a first resource to efficiently store a theoretically unlimited number of data elements in a queue at a second resource that need not be trusted. In accordance with an embodiment of the present invention, the first resource need only store two signatures, $S_R$ and $S_Q$, in order to determine the validity of any data element and signature retrieved from such a queue. In other words, an embodiment of the present invention can detect any changes in the value of a retrieved data element, advantageously detecting unauthorized modifications. Likewise, the present invention can advantageously detect any changes in the order in which data elements are provided to the first resource from the queue. For example, if a data element that was stored in a queue by a first resource is later provided to the first resource out of order (e.g., violating the first-in, first-out ordering of the queue), this change in order can be advantageously detected in accordance with the present invention. Thus, data elements of different values stored by the first resource in the queue cannot be switched in order (or otherwise provided to the first resource out of order) without being detected by the first resource.

An embodiment of the present invention advantageously allows a first resource with limited memory resources to reliably store a theoretically unlimited number of data elements in one or more queues, while only requiring the first resource to store two signatures for each queue. In this embodiment, a queue identifier (e.g., S(initial)) for each queue may also be stored at the first resource in order to distinguish the queues.

DETAILED DESCRIPTION

The present invention involves signing data to produce a signature. The terms "signing" and "signature" as used herein refer to the process of treating a first piece of data in such a way as to obtain a second piece of data that is useful in ascertaining that the first piece of data has a certain property. For example, an important property pertaining to the present invention is that the technique of cryptographic signing is useful in ascertaining for a first piece of data is whether the first piece of data is the same as a second piece of data. This can be determined using cryptographic signing in accordance with the present invention.

An example of a cryptographic system that supports cryptographic signing is symmetric key encryption. In symmetric key encryption, the cryptographic key is kept secret. If a particular key is used to encrypt data, only the same key can decrypt the data.

In one embodiment of the present invention, a first data element and a first signature are signed by a first resource using a symmetric key that the first resource keeps secret. This produces a second signature. In one embodiment, the encrypted version of the first data element and first signature is the second signature. In another embodiment, a signature is produced by generating a message digest from the first data element and first signature, and then encrypting the message digest using the symmetric key. A message digest functions much like a serial number to uniquely identify the data from which it is derived. Here, the encrypted message digest is the signature. The present invention can use any authentication system and is not limited to a symmetric key encryption system. For example, the present invention can use a one-time pad system, public key encryption, and so on.

In accordance with an embodiment of the present invention, the first resource advantageously need only store a single signature and any key material necessary to sign data.

Figure 1:
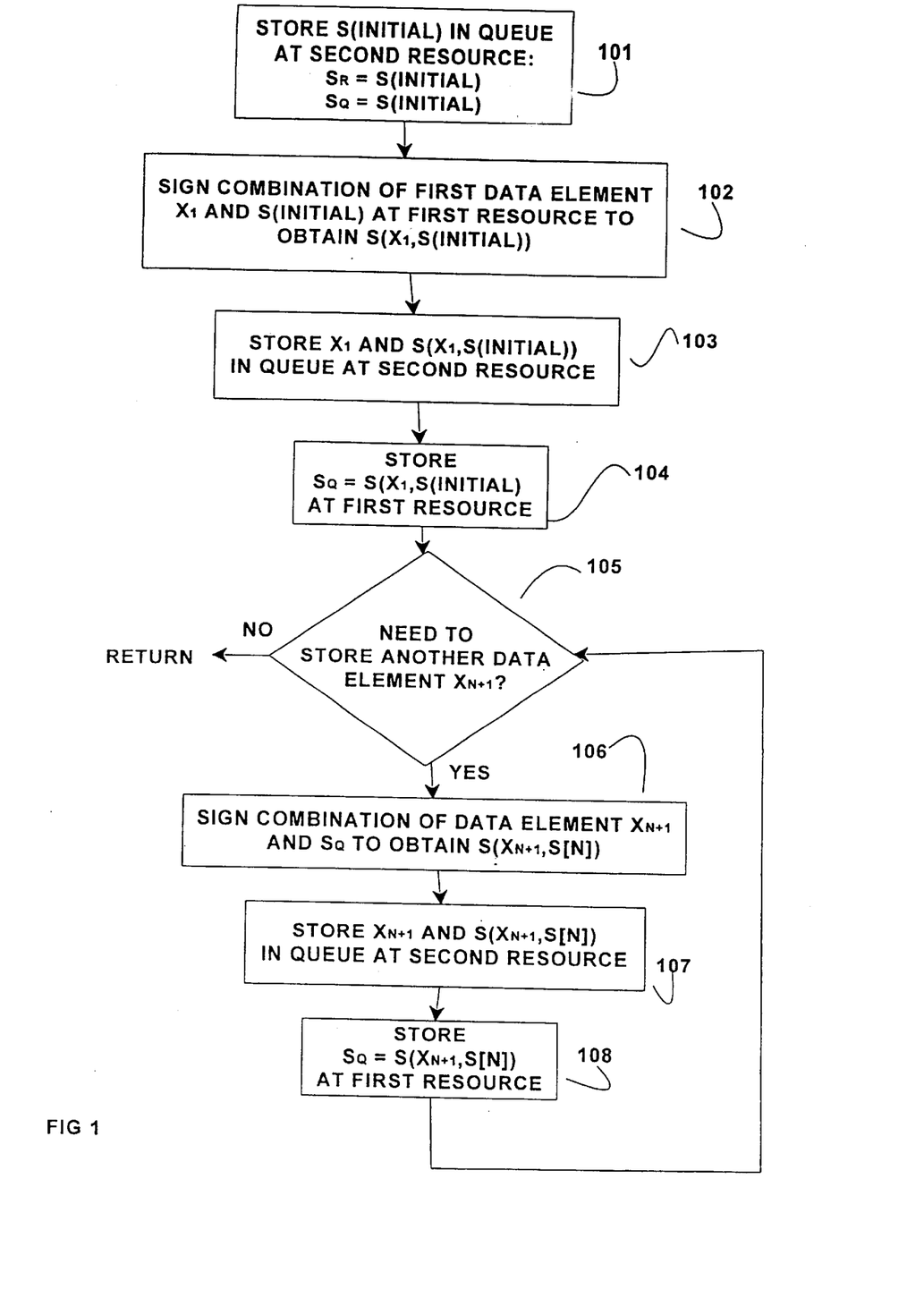
FIG. 1 is a flow chart showing an embodiment of the method for using a second resource to store a data element $X_{N+1}$ from a first resource in a first-in, first-out queue at a second resource in accordance with the present invention.

FIG. 1 is a flow chart showing an embodiment of the method for using a second resource to enqueue (store on a queue) a data element from a first resource in accordance with the present invention. Two variables, $S_R$ and $S_Q$, are each assigned the same value, called S(initial), step 101. S(initial) is called the initial signature. As used herein, the term "initial signature" has a somewhat broader meaning than one of ordinary skill in the art may attach to it. In accordance with the present invention, an initial signature can be a signature of a data element stored in the queue. However, the initial signature need not be a signature at all. An initial signature can be a nonce. A nonce is a number that is, for practical purposes, used only once in a given application. A large random number is an example of a nonce. Indeed, the initial signature can be any digital number. This number (whether or not it is a signature) can be used to identify a queue, i.e., it can serve as the queue's name. Functioning in this way, the initial signature can differentiate the queue from other queues on the same second resource, or on another resource that stores data elements from the first resource.

In accordance with an embodiment of the present invention, a combination of the first data element $X_1$ and the initial signature S(initial) are signed at the first resource to obtain a signature $S(X_1,S(initial))$, step 102. The data element $X_1$ and the signature $S(X_1,S(initial))$ are stored in the queue at the second resource, step 103. The signature $S(X_1,S(initial))$ is stored at the first resource as the new value for variable $S_Q$ at the first resource, step 104.

Thereafter, if another data element is to be stored at the second resource, step 105, then a combination of each data element $X_{N+1}$ and the present value of $S_Q$ is signed at the first resource, step 106. For data element $X_{N+1}$, the value of $S_Q$ is $S(X_N,S(X_{N-1},S(X_{N-2},S(\ldots S(X_1,S(initial))) \ldots )$, N being a integer. For brevity, a signature of the form $S(X_N, S(X_{N-1},S(X_{N-2},S(\ldots S(X_1,S(initial)) \ldots )$ will hereinafter be denoted $S[N]$. Thus, for example, the signature $S(X_{N+1}, S(X_N,S(X_{N-1},S(X_{N-2},S(\ldots S(X_1,S(initial))) \ldots )$ (i.e., $X_{N+1}$ and the present value of $S_Q$) is denoted $S[N+1]$, or equivalently as $S[X_{N+1},S[N]]$.

The data element $X_{N+1}$ is then sent along with the signature $S(X_{N+1},S[N])$ to the second resource to be stored in the queue, step 107. The signature $S(X_{N+1},S[N])$ is stored as the new value for $S_Q$ at the first resource, step 108.

Figure 2:
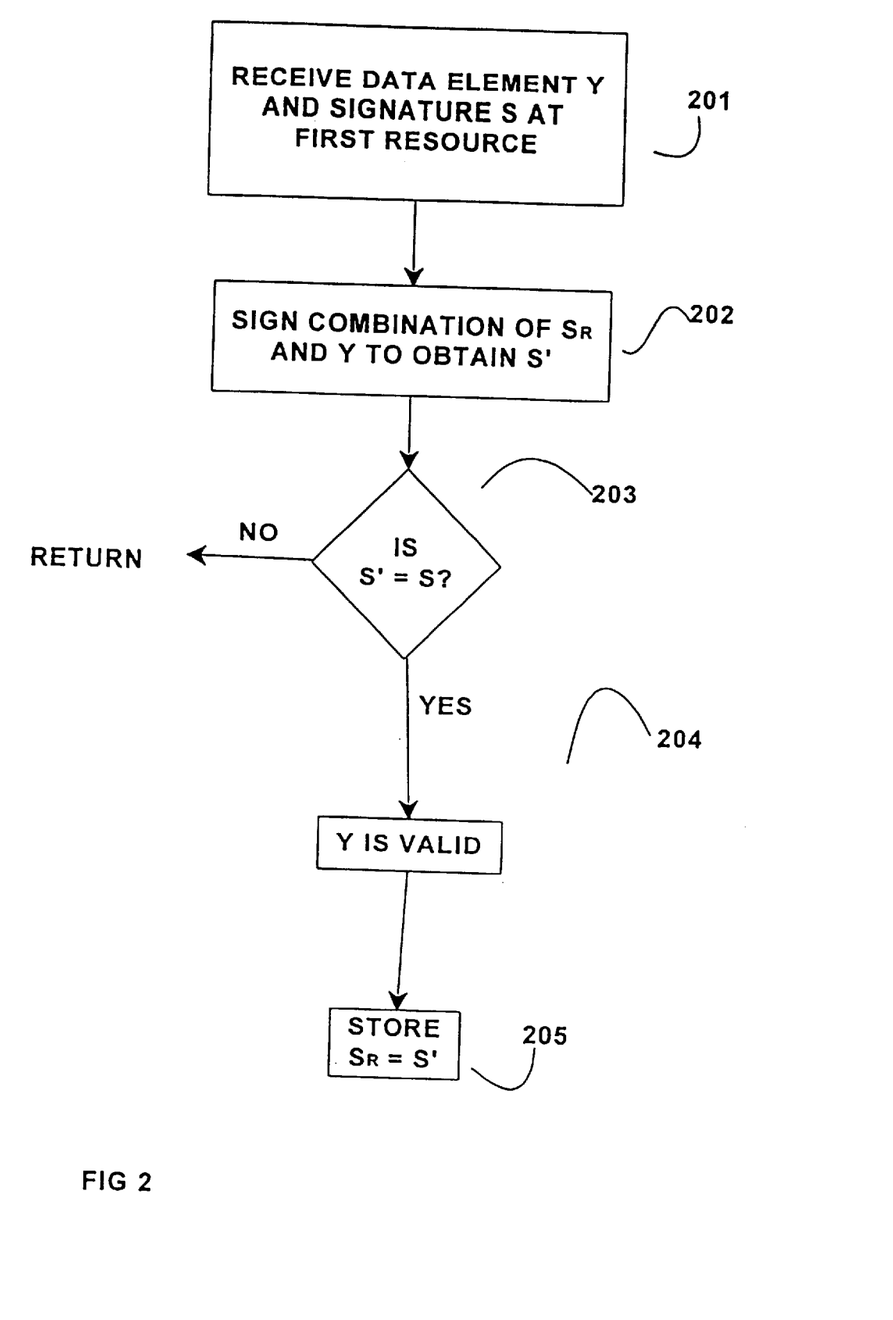
FIG. 2 is a flow chart showing an embodiment of the method for verifying that a second data element received at the first resource is valid.

FIG. 2 is a flow chart showing an embodiment of the method for using a second resource to dequeue (remove and verify a data element from a queue) a data element from a second resource in accordance with the present invention. A data element Y and a signature S is received at the first resource, step 201. A combination of Y and $S_R$ is signed at the first resource to obtain a signature S', step 202. $S_R$ is a signature whose value is $S[M]$, where M is the number of data elements removed from the queue at the second resource. If S' is equal to S, step 203, then Y is determined to be valid, step 204. S' (or S, because S'=S) is stored as the new value for $S_R$, step 205.

Thus, in accordance with an embodiment of the present invention, the first resource need only store two signatures, $S_R$ and $S_Q$ in order to verify the validity of a theoretically unlimited number of data elements stored on a queue at a second resource. The value of $S_R$ is $S[M]$, where M is the number of data elements removed from the queue at the second resource. The value of $S_Q$ is $S[P]$, where P is the number of data elements ever stored on the queue.

Figure 3:
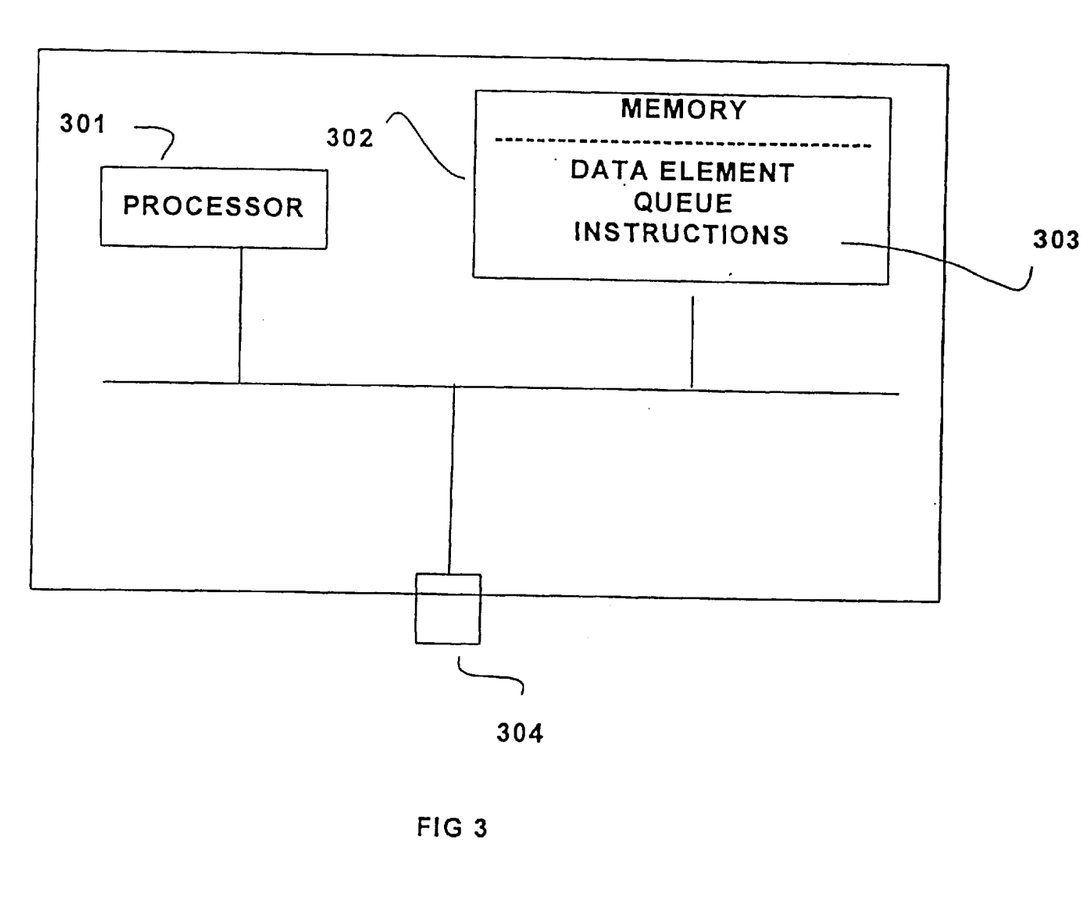
FIG. 3 illustrates an embodiment of an apparatus in accordance with the present invention.

FIG. 3 shows an embodiment of an apparatus in accordance with the present invention. The apparatus comprises a processor 301 and a memory 302 that stores data element queue instructions 303. Data element queue instructions 303 are adapted to be executed on processor 301 to sign a data element $X_{N+1}$ and a signature $S_Q=S[N]$ at a first resource to obtain a signature $S[X_{N+1},S[N]]$, where N is an integer, send the data element $X_{N+1}$ and the signature $S[X_{N+1},S[N]]$ from the first resource to the second resource to be stored in the queue at the second resource; and store the signature $S[X_{N+1},S[N]]$ as the new value for $S_Q$ at memory 302. The apparatus further comprises a port 304 adapted to be coupled to another resource. In an embodiment, port 304 is adapted to be coupled to another resource through a PCMCIA interface. In an embodiment, port 304 is adapted to be coupled to another resource through a network. Port 304 and memory 302 are coupled to processor 301.

In one embodiment, memory 302 is Random Access Memory (RAM). In another embodiment, memory 302 is a hard disk drive. In yet another embodiment, memory 302 is a combination of RAM and a hard disk drive.

In an embodiment, data element queue instructions 303 are further adapted to be executed on processor 301 to receive a data element Y and a signature S at the first resource, sign a combination of the data element Y and a signature $S_R$ to obtain a signature S', where $S_R$ is equal to the value of $S[M]$, where M is the number of data elements that have been removed from the queue. The instructions 303 are further adapted to be executed on processor 301 to determine if the data element Y is valid based upon signature S' and signature $S_R$ (e.g., if S'=S).

Figure 4:
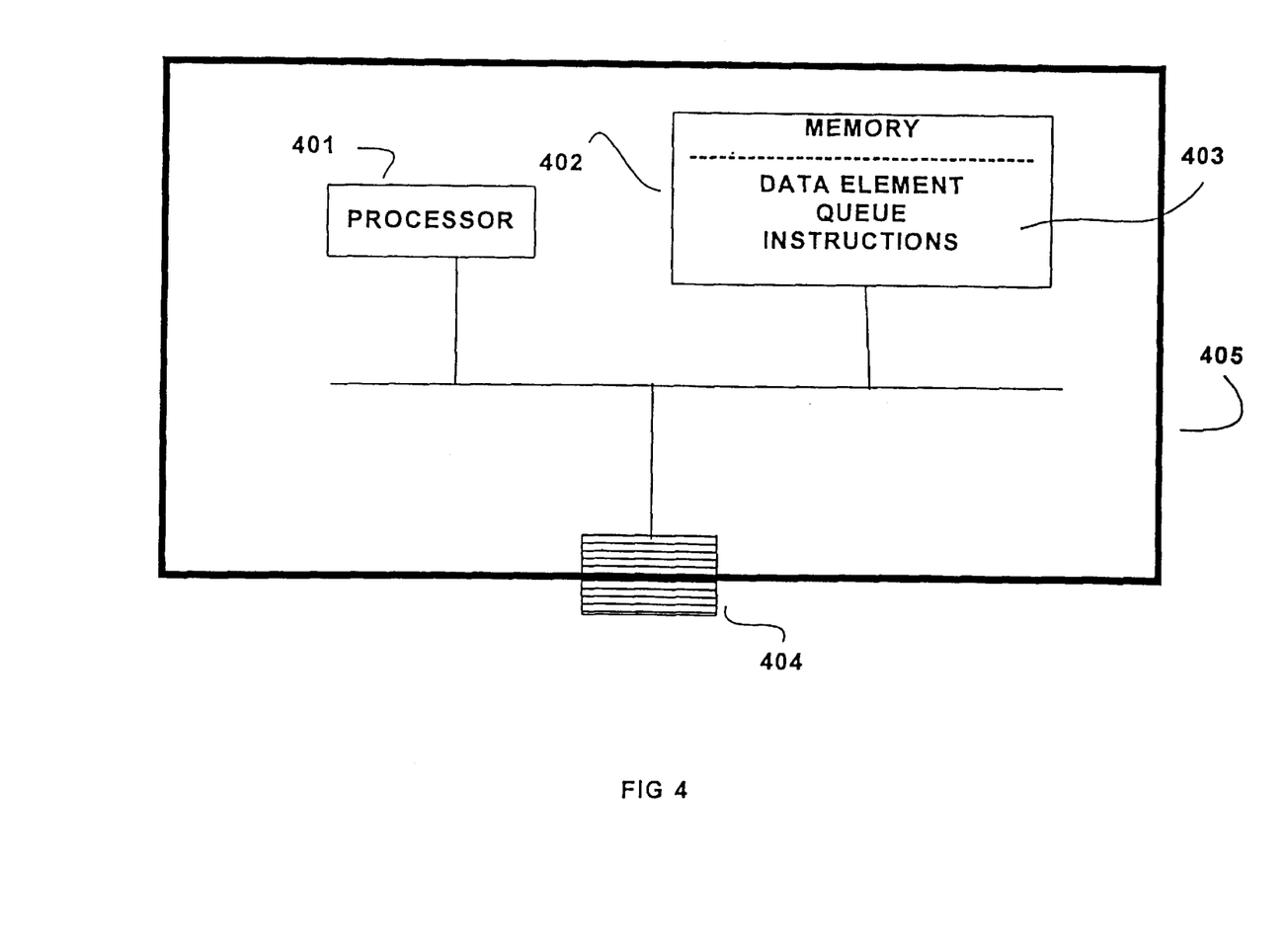
FIG. 4 illustrates an embodiment of an apparatus in accordance with the present invention that includes a tamper-proof enclosure.

FIG. 4 shows another embodiment of the apparatus in accordance with the present invention. In this embodiment, the apparatus comprises a processor 401 and memory 402 that stores data element queue instructions 403 adapted to be executed by processor 401 to sign a data element $X_{N+1}$ and a signature $S_Q=S[N]$ at a first resource to obtain a signature $S[X_{N+1},S[N]]$, where N is an integer, send the data element $X_{N+1}$ and the signature $S[X_{N+1},S[N]]$ from the first resource to the second resource to be stored in the queue at the second resource; and store the signature $S[X_{N+1},S[N]]$ as the new value for $S_Q$ at memory 402.

The apparatus further comprises a tamper-proof enclosure surrounding processor 401 and memory 402. Port 404 is an electrical interface disposed to conduct electrical signals through said tamper-proof enclosure 405. Port 405 is coupled to processor 401 and memory 402.

Figure 5:
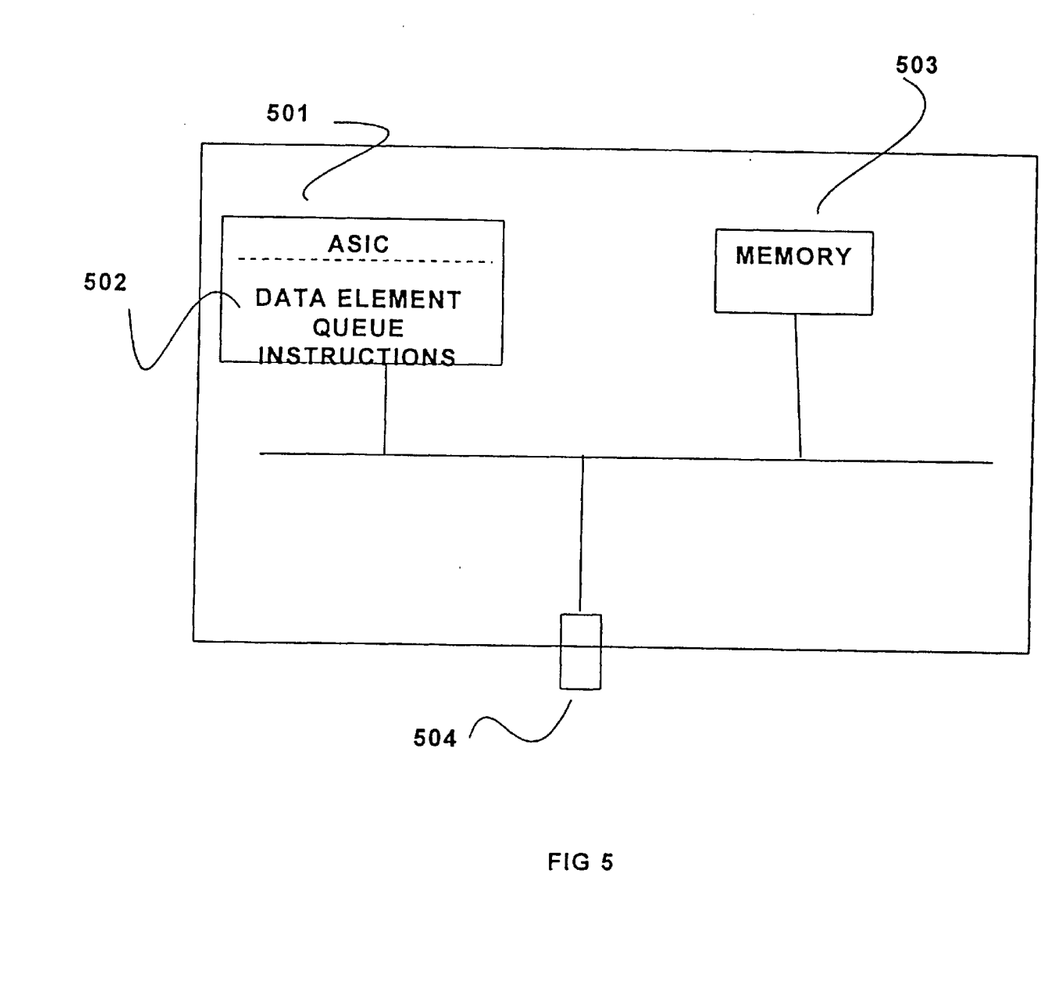
FIG. 5 illustrates an embodiment of the apparatus in accordance with the present invention that includes an application specific integrated circuit.

FIG. 5 shows yet another embodiment of the apparatus in accordance with the present invention. The apparatus comprises an application specific integrated circuit (ASIC) 501. ASIC 501 embodies data element queue instructions 502 adapted to be executed by ASIC 501 to sign a data element $X_{N+1}$ and a signature $S_Q=S[N]$ at a first resource to obtain a signature $S[X_{N+1},S[N]]$, where N is an integer, send the data element $X_{N+1}$ and the signature $S[X_{N+1},S[N]]$ from the first resource to the second resource to be stored in the queue at the second resource, and store the signature $S[X_{N+1},S[N]]$ as the new value for $S_Q$ in memory 503. The apparatus further comprises port 504 adapted to be coupled to another resource. Memory 503 and port 504 are coupled to ASIC 501.

In an embodiment, queue instructions 502 are further adapted to be executed by ASIC 501 to receive a data element Y and a signature S at the first resource, sign a combination of the data element Y and a signature $S_R$ to obtain a signature S', where $S_R$ is equal to the value of $S[M]$, where M is the number of data elements that have been removed from the queue, determine if the data element Y is valid using signatures S' and $S_R$ (e.g., if S'=$S_R$), and store S' as the new value for $S_R$.

Figure 6:
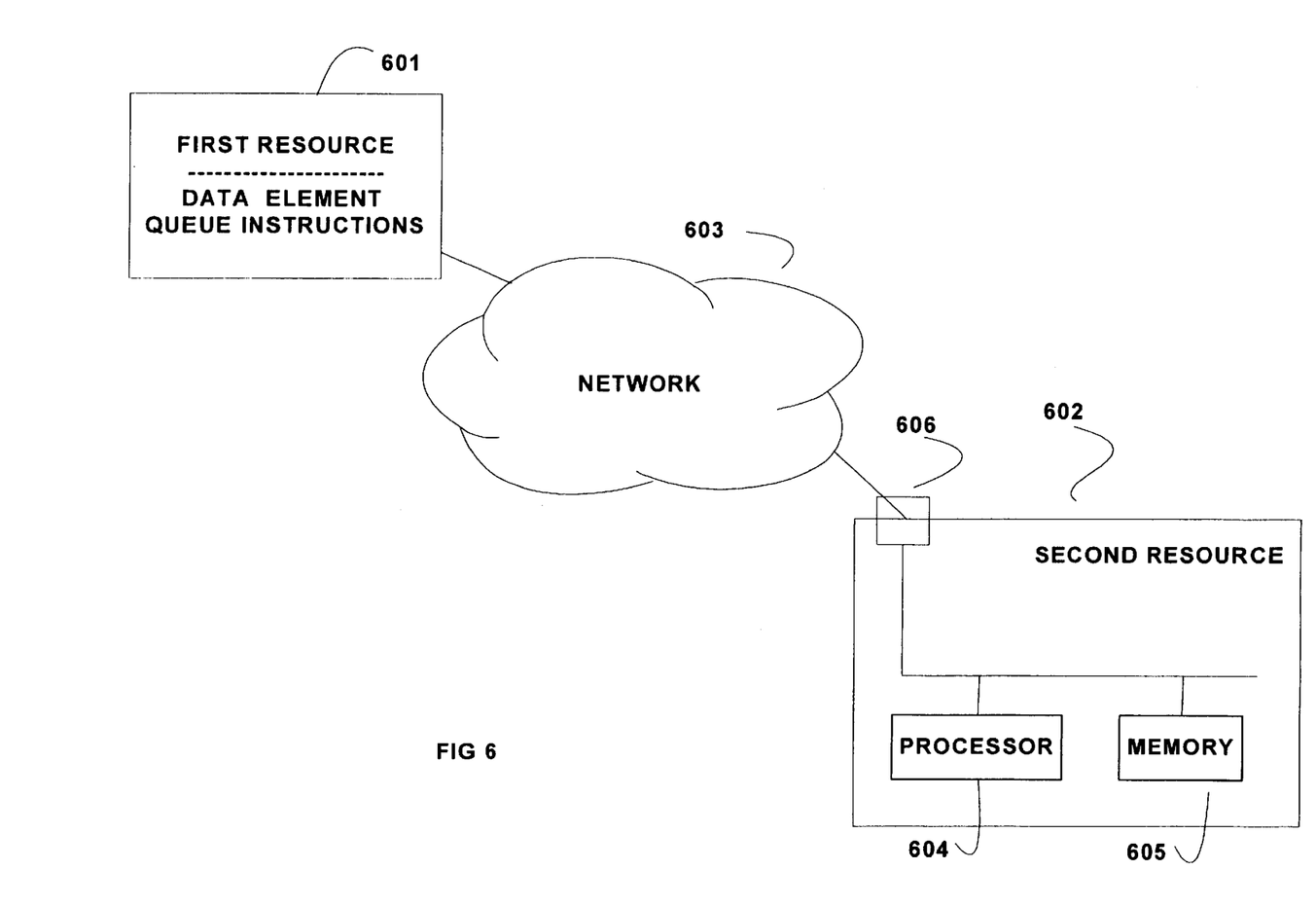
FIG. 6 illustrates a system level embodiment of the present invention where the first resource and second resource communicate through a network.

A system level embodiment of the present invention is shown in FIG. 6. First resource 601 uses second resource 602 to store a data element. Data elements and signatures are sent from and received at first resource 601 to and from second resource 602 through network 603. In accordance with the present invention, network 603 can be connection-oriented, connectionless, circuit switched, packet switched, or any combination thereof, or an internetwork of networks. In accordance with the present invention, second resource 602 comprises a processor 604, a memory 605 adapted to store a data element and a signature, and a port 606. Port 606 and memory 605 are coupled to processor 604.

Figure 7:
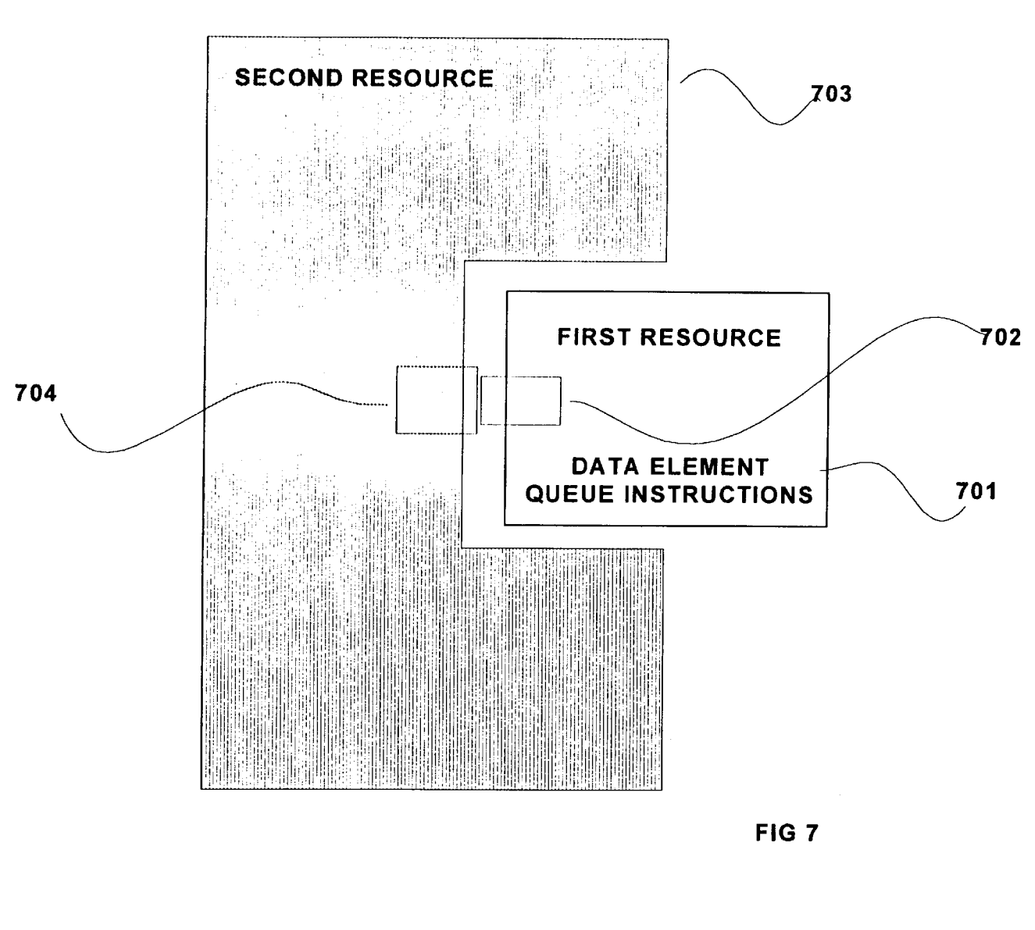
FIG. 7 illustrates a system level embodiment of the present invention wherein the first resource and the second resource communicate with each other through their respective interfaces.

FIG. 7 shows another system level embodiment of the present invention. In this embodiment, the first resource 701 is a smart card with a first resource interface 702. Second resource 703 has a second resource interface 704. The first resource interface 702 is adapted to communicate with second resource interface 704. One embodiment of the present invention, second resource 703 is a laptop computer and first resource 701 is a smart card coupled to the computer through a PCMCIA interface.

The present invention advantageously allows a first resource to efficiently store data elements in a queue at a second resource, which the first resource need not trust. An embodiment of the present invention can store a theoretically unlimited number of data elements in a queue at a second resource while only having to store two signatures, $S_Q$ and $S_R$. When the first resource retrieves a data element (and signature) purported to be from a queue at a second resource, the first resource can advantageously determine if the retrieved data element is valid, e.g., that the retrieved data element is the same as a data element earlier sent from the first resource to be stored at the second resource. In accordance with an embodiment of the present invention, a first resource with limited memory can advantageously use a second resource that need not be trusted by the first resource to store data elements in a trusted fashion.

Although several embodiments of the present invention are specifically illustrated and described herein, modifications and variations of the present invention are covered by the above teachings and within the purview of the appended claims without departing from the spirit and intended scope of the invention.

What is claimed is:

1. A method for storing a data element from a first resource in a first-in, first-out queue at a second resource, comprising the steps of:
   signing a data element $X_{N+1}$ and a signature $S_Q=S[N]=S(X_N,S(X_{N-1},S(X_{N-2},S(\ldots S(X_1,S(\text{initial}))\ldots))$ at a first resource to obtain a signature $S[X_{N+1},S[N]]$, where N is an integer and S(initial) is any arbitrary initial value;
   providing the data element $X_{N+1}$ and the signature $S[X_{N+1},S[N]]$ from the first resource to the second resource; and
   storing the signature $S[X_{N+1},S[N]]$ as the new value for $S_Q$.

2. The method of claim 1, further comprising the steps of:
   obtaining a data element Y and a signature S at the first resource;
   signing a combination of the data element Y and a signature $S_R$ to obtain a signature S', where $S_R$ is equal to the value of S[M], where M is the number of data elements that have been removed from the queue; and
   determining if the signature S' is the same as the signature S.

3. The method of claim 1, further comprising the steps of:
   obtaining a data element Y and a signature S at the first resource;
   signing a combination of the data element Y and a signature $S_R$ to obtain a signature S', where $S_R$ is equal to the value of S[M], where M is the number of data elements that have been removed from the queue;
   determining if the signature S' is the same as the signature S; and
   if the signature S' is the same as the signature S, determining that the data element Y is valid.

4. The method of claim 1, further comprising the steps of:
   obtaining a data element Y and a signature S at the first resource;
   signing a combination of the data element Y and a signature $S_R$ to obtain a signature S', where $S_R$ is equal to the value of S[M], where M is the number of data elements that have been removed from the queue;
   determining if the signature S' is the same as the signature S; and
   if the signature S' is the same as the signature S:
      determining that the data element Y is valid; and
      storing S' as the new value for $S_R$.

5. An apparatus for storing a data element in a queue at a second resource, comprising:
   a processor;
   a memory that stores instructions adapted to be executed by said processor to sign a data element $X_{N+1}$ and a signature $S_Q=S[N]=S(X_N,S(X_{N-1},S(X_{N-2},S(\ldots S(X_1,S(\text{initial}))\ldots)$ to obtain a signature $S[X_{N+1},S[N]]$, where N is an integer and S(initial) is any arbitrary initial value, provide the data element $X_{N+1}$ and the signature $S[X_{N+1},S[N]]$ to the second resource, and store the signature $S[X_{N+1},S[N]]$ as the new value for $S_Q$ in said memory; and
   a port adapted to be coupled to the second resource and through which the data element $X_{N+1}$ and signature $S[X_{N+1},S[N]]$ are transmitted to the second resource, said port and said memory coupled to said processor.

6. The apparatus of claim 5, wherein said instructions are further adapted to be executed by said processor to obtain a data element Y and a signature S at the first resource, sign a combination of the data element Y and a signature $S_R$ to obtain a signature S', where $S_R$ is equal to the value of S[M], where M is the number of data elements that have been removed from the queue, and determine if the data element Y is valid using signatures S' and S.

7. The apparatus of claim 5, further comprising a tamper-proof enclosure surrounding said processor and memory.

8. The apparatus of claim 5, wherein said port comprises an electrical interface disposed to conduct electrical signals through a tamper-proof enclosure to said processor.

9. The apparatus of claim 5, wherein said port is adapted to be coupled to the second resource through a network.

10. The apparatus of claim 5, wherein said port is adapted to be coupled to the second resource through a PCMCIA interface.

11. A medium that stores instructions adapted to be executed by a processor to perform the steps of:
   signing a data element $X_{N+1}$ and a signature $S_Q=S[N]=S(X_N,S(X_{N-1},S(X_{N-2},S(\ldots S(X_1,S(\text{initial}))\ldots))$ at a first resource to obtain a signature $S[X_{N+1},S[N]]$, where N is an integer and S(initial) is any arbitrary initial value;
   providing the data element $X_{N+1}$ and the signature $S[X_{N+1},S[N]]$ from the first resource to the second resource; and
   storing the signature $S[X_{N+1},S[N]]$ as the new value for $S_Q$.

12. The medium of claim 11, wherein said instructions are further adapted to be executed by a processor to perform the steps of:

obtaining a data element Y and a signature S at the first resource;

signing a combination of the data element Y and a signature $S_R$ to obtain a signature S', where $S_R$ is equal to the value of S[M], where M is the number of data elements that have been removed from the queue; and determining if the data element Y is valid using signatures S' and S.

13. The medium of claim 11, wherein said instructions are further adapted to be executed by a processor to perform the steps of:

obtaining a data element Y and a signature S at the first resource;

signing a combination of the data element Y and a signature $S_R$ to obtain a signature S', where $S_R$ is equal to the value of S[M], where M is the number of data elements that have been removed from the queue;

determining if the signature S' is the same as the signature S;

if the signature S' is the same as the signature $S_R$, determining that the data element Y is valid.

14. A system for storing a data element from a first resource at a second resource in a stack, comprising:

means for signing a data element $X_{N+1}$ and a signature $S_Q = S[N] = S(X_N, S(X_{N-1}, S(X_{N-2}, S( \ldots S(X_1, S(\text{initial})) \ldots )$ at a first resource to obtain a signature $S[X_{N+1}, S[N]]$, where N is an integer and S(initial) is any arbitrary initial value;

means for providing the data element $X_{N+1}$ and the signature $S[X_{N+1}, S[N]]$ from the first resource to the second resource; and means for storing the signature $S[X_{N+1}, S[N]]$ as the new value for $S_Q$.

15. The system of claim 14, further comprising:

means for obtaining a data element Y and a signature S at the first resource;

means for signing a combination of the data element Y and a signature $S_R$ to obtain a signature S', where $S_R$ is equal to the value of S[M], where M is the number of data elements that have been removed from the queue; and means for determining if the signature S' is the same as the signature S.

16. The system of claim 14, further comprising:

means for obtaining a data element Y and a signature S at the first resource;

means for signing a combination of the data element Y and a signature $S_R$ to obtain a signature S', where $S_R$ is equal to the value of S[M], where M is the number of data elements that have been removed from the queue; and means for determining if data element Y is valid.

17. A method for storing a data element from a smart card in a first-in, first-out queue at a computer, comprising:

signing a data element $X_{N+1}$ and a signature $S_Q = S[N] = S(X_N, S(X_{N-1}, S(X_{N-2}, S( \ldots S(X_1, S(\text{initial})) \ldots )$ at the smart card to obtain a signature $S[X_{N+1}, S[N]]$, where N is an integer and S(initial) is any arbitrary initial value;

providing the data element $X_{N+1}$ and the signature $S[X_{N+1}, S[N]]$ to the computer; and storing the signature $S[X_{N+1}, S[N]]$ as the new value for $S_Q$.

* * * * *